United States Patent [19]

Brown

[11] 4,142,512

[45] Mar. 6, 1979

[54] SOLAR VAPORIZING CHAMBER

[76] Inventor: Darrell R. Brown, 2558 NW. 19th St., Oklahoma City, Okla. 73107

[21] Appl. No.: 731,233

[22] Filed: Oct. 12, 1976

[51] Int. Cl.² ............................................. F24J 3/02
[52] U.S. Cl. .................................... 126/271; 126/270
[58] Field of Search ............... 126/270, 271; 237/1 A, 237/67, 64; 137/564; 60/641; 165/105; 122/366

[56] References Cited

U.S. PATENT DOCUMENTS

| | | | |
|---|---|---|---|
| 1,812,516 | 6/1931 | Dooley | 126/271 |
| 1,951,403 | 3/1934 | Goddard | 60/641 |
| 1,969,839 | 8/1934 | Goddard | 126/271 |
| 2,259,902 | 10/1941 | McCain | 126/271 |
| 2,342,062 | 2/1944 | Schenk | 126/271 |
| 2,918,219 | 12/1959 | MacCracken | 237/64 |
| 3,008,297 | 11/1961 | Plimpton, Jr. | 122/366 X |
| 3,556,124 | 1/1971 | Walton | 137/564 |
| 3,654,759 | 4/1972 | Abbot | 60/641 |
| 3,813,037 | 5/1974 | Bekedam | 237/67 X |
| 3,940,058 | 2/1976 | Norris | 237/67 X |
| 4,033,134 | 7/1977 | Bentley | 60/641 |

*Primary Examiner*—William F. O'Dea
*Assistant Examiner*—Larry Jones

[57] ABSTRACT

The present invention consists of a novel solar liquid vaporizing chamber for receiving liquids for vaporization. Hot vapors are released from the chamber and piped to desired locations while additional liquids are introduced into the chamber for vaporization.

9 Claims, 14 Drawing Figures

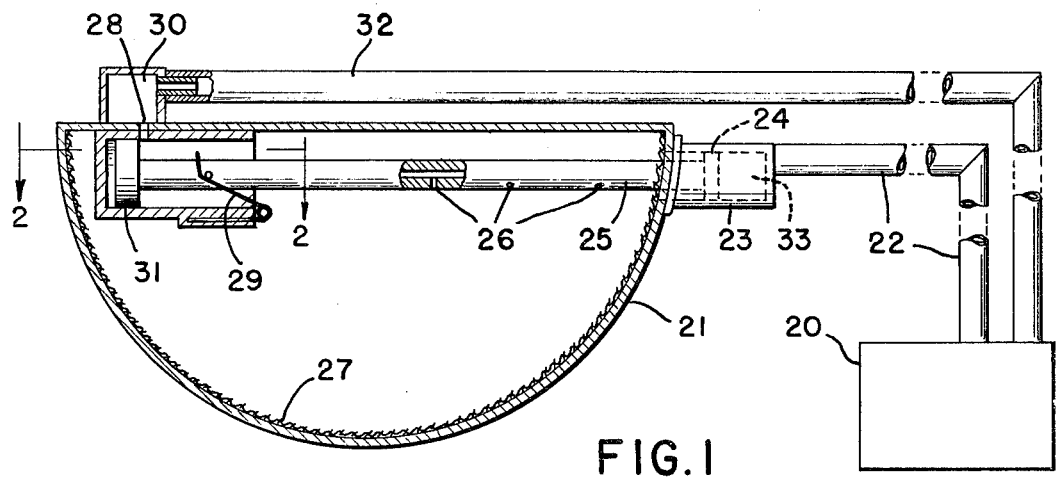
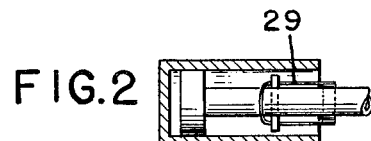
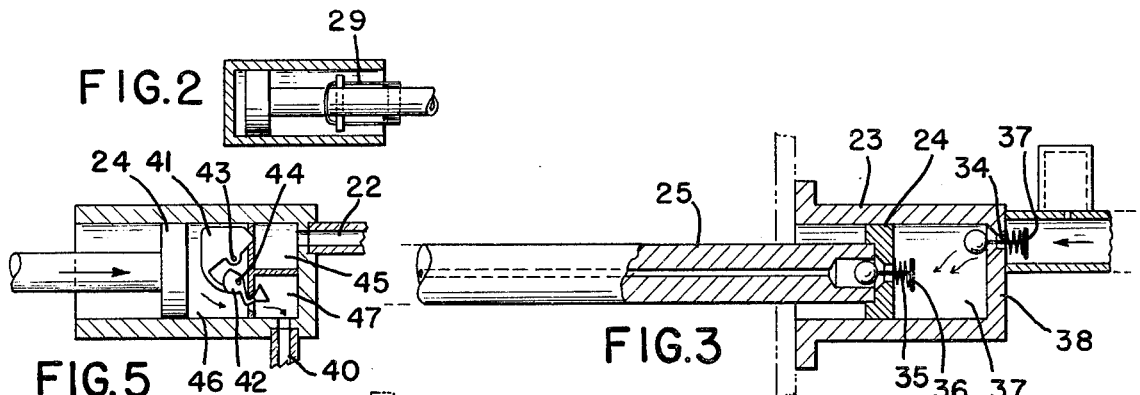
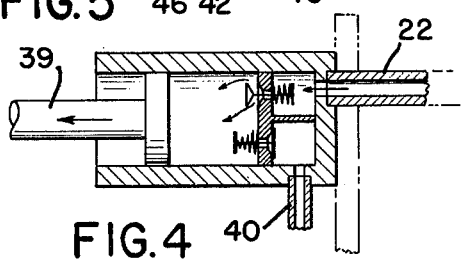
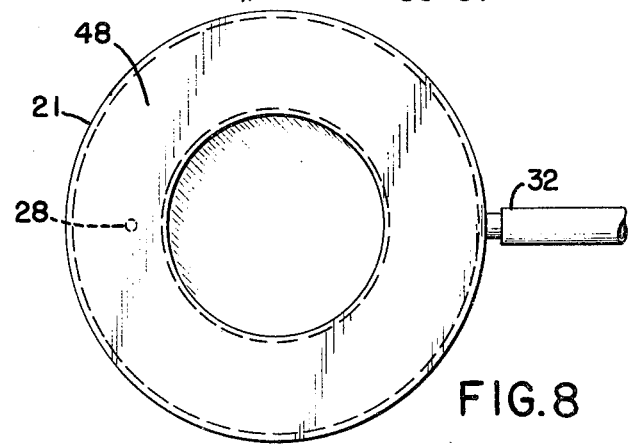
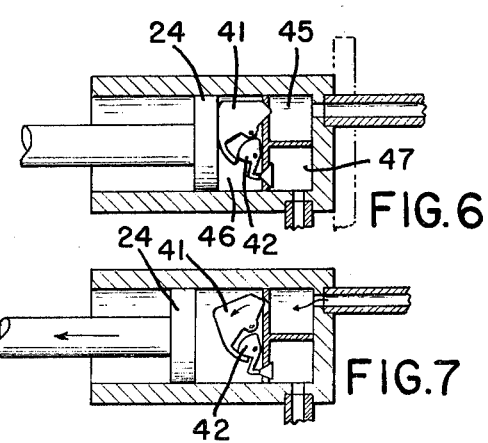
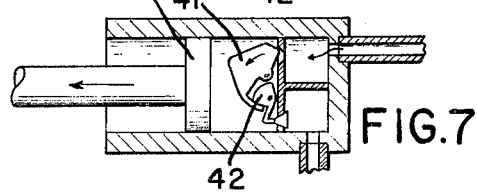
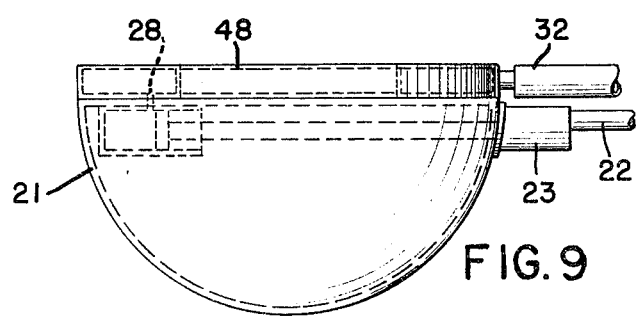

SOLAR VAPORIZING CHAMBER

BACKGROUND AND OBJECTIVES OF THE INVENTION

There are three ways in which heat may be transferred from a body of higher temperature to one of lower temperature: by radiation, by conduction or by convection.

The transmission of heat through space is known as radiation and is governed by the same physical laws as in the radiation of light. For example, the sun's radiant energy is transmitted through space and heats the surface of the earth.

Heat conduction is the passage from a body of higher temperature to another body at a lower temperature of heat which is brought in contact with it. For example, if a copper bar is heated at one end by an open flame, the heat will be conducted through the copper bar to the opposite end.

The present invention concerns the third method of heat transmission, namely heat convection, which is the process of flowing a fluid over a solid surface accompanied by a transfer of heat between the fluid and the surface.

There are many devices known in the heating art which use the convection method to heat homes and buildings. For example, steam boilers utilize this principal as hot water is converted to steam which passes throughout the building in pipes to radiators which are positioned at strategic locations. The surfaces of the radiators, after being heated by the steam, give off their heat to the cooler surrounding air. Hence a double convection takes place, first in the steam heating the radiator, and secondly the radiator surfaces heating the cooler room air.

Resistance coil heaters are also an example of the convection type, in that the heated coil gives up its energy to the cooler surrounding room air, thereby raising the temperature thereof.

With costs rising almost daily for energy production, newer, less expensive heating devices have been sought, many of which have utilized the energy generated by the sun.

Conventional solar heating devices have been generally difficult to regulate, and have been expensive to construct and it is objective of this invention to construct a solar heating device in which the temperature can be easily regulated.

It is another objective of this invention to provide a solar heating system which can deliver heat downwardly through a flexible pipe or other means more economically and faster than known methods.

It is yet another objective of the present invention to provide a solar heating device which is relatively inexpensive and economical to construct.

It is still another object of the present invention to provide a solar heating device with a superheater, to provide the heated fluids with additional energy to prevent premature condensation from occurring.

It is a further objective of this invention to provide a solar heating system which has no secondary power source and therefore is economical and mobile.

It is yet another objective of this invention to provide a solar heating system which can deliver heated fluids downwardly and while having the capability to retrieve and recycle said fluids without secondary power sources and without the use of capillary action.

DESCRIPTION OF THE DRAWINGS AND PREFERRED EMBODIMENT

This invention consists of a liquid vaporizing chamber which may be hemispherically shaped, though cylindrical and flat plate types may also be utilized, whereby the rays from the sun, reflected or direct, strike the outer surface of the chamber and vaporize the liquid contained therein. A liquid entry port and vapor exit port is provided with suitable valve arrangements whereby liquid introduced into the chamber is vaporized, for example water may be vaporized into steam, and the steam then passes through the exiting port and is directed to a desired location to be utilized, for example, in cooking.

As the rays of the sun strike the heating chamber, pressure develops inside the chamber due to the increasing temperature and forces the valve mechanism in juxtaposition to the exit port to open, allowing the steam to enter the discharge pipes where it is directed to a predetermined location away from the heating chamber.

Various valve arrangements may be utilized which allow the liquid entry port to open, allowing more liquid to be delivered to the heating chamber, while simultaneously closing the vapor exiting port following escapement of the steam, or other vapors from suitable liquids employed. Such an arrangement would allow liquid to enter the valve chamber to await entry into the heating chamber, while simultaneously opening the vapor exiting port to allow escapement of the steam or other vapors from the heating chamber.

In another embodiment, the heating chamber may be equipped with a superheater to further heat the vapors after they exit from the heating chamber so that they will remain free from suspended droplets of liquid. The superheater consists of an additional chamber in which the steam or vapor is subjected to additional radiation by the sun absent contact with the liquid, thus raising the vapor's temperature without simultaneously raising its pressure to the saturation point.

The solar heat generator can also be equipped with a solar radiation shield or cover which moves around the solar energy receiving portions of the generator, to block or shield, partially or fully, the heating chamber and any superheater from the rays of the sun. The cover can be thermostatically controlled so that as the heat inside the chamber approaches the desired temperature, the shield will revolve and limit the solar rays reaching the heating chamber. Likewise, when the temperature falls below a desired range in the heating chamber, the shield can rotate to a more open position allowing additional energy from the sun to reach the heating chamber. A bimetallic coil in contact thermally with the generator could also be adapted to activate and control the movement of the shield.

Turning now to the drawings, FIG. 1 represents a cross sectional view of the preferred embodiment of the solar heating chamber.

FIG. 2 is a top view of the vapor exiting valve utilized in the preferred embodiment.

FIG. 3 shows the liquid entry valve arrangement with a liquid passage contained inside the piston rod.

FIG. 4 shows another embodiment of the liquid entry valve arrangement with the liquid passage being independent of the piston rod.

FIG. 5 is yet another embodiment of the liquid entry valve arrangement showing a camming valve with the bottom valve member open.

FIG. 6 shows the valve arrangements of FIG. 5 with both the top and bottom valve members closed.

FIG. 7 shows the coming valve of FIG. 5 in still another position with the top portion of the camming valve open.

FIG. 8 demonstrates the top view of another embodiment of the solar heating chamber with a superheater positioned thereon.

FIG. 9 is a cross sectional view of FIG. 8 showing the positioned superheater above the liquid vaporizing chamber.

Figure 10:
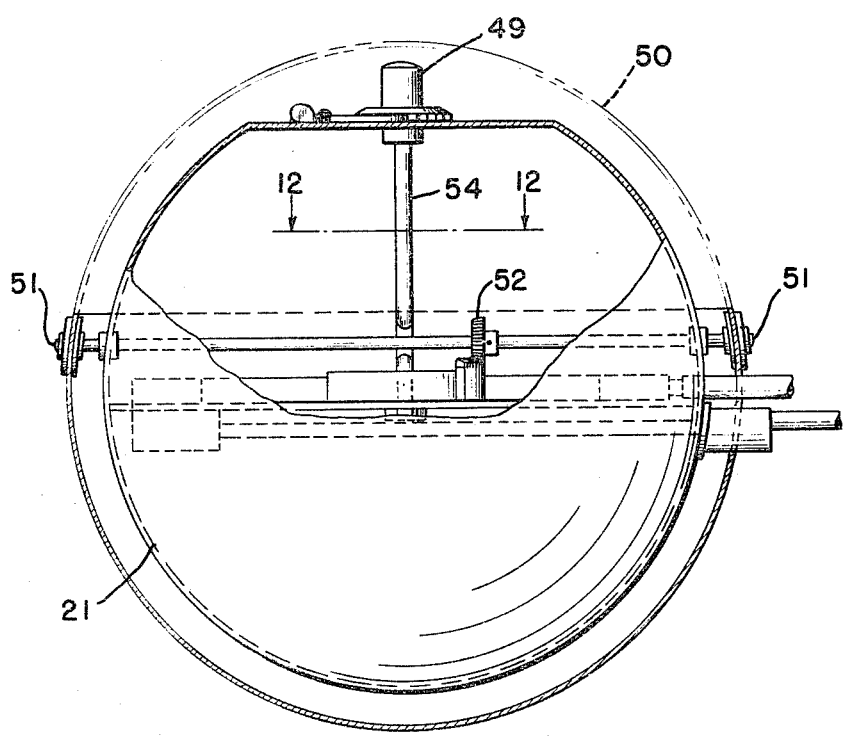

FIG. 10 shows yet another embodiment of the heating chamber with a rotatable cover, thermostatically controlled, positioned thereon.

Figure 11:
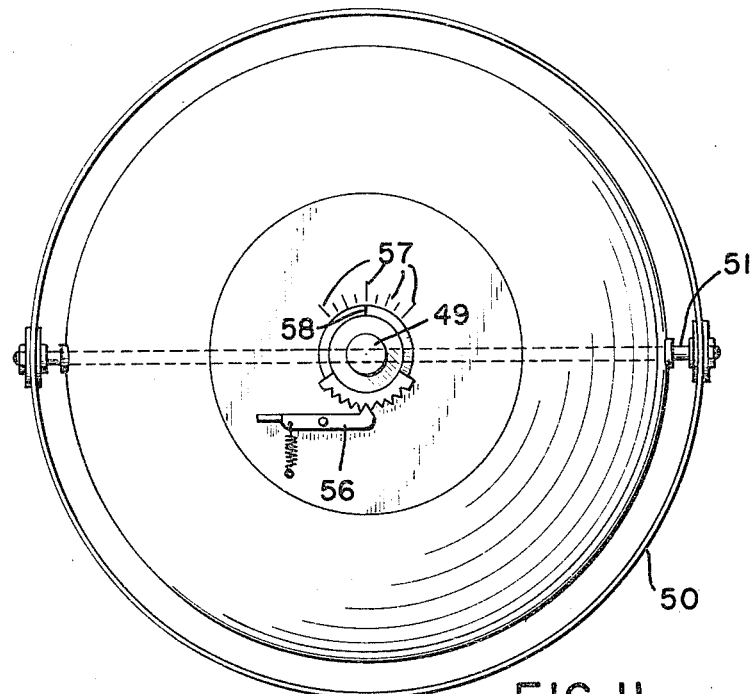

FIG. 11 is a top view showing the thermostat control of FIG. 10

Figure 12:
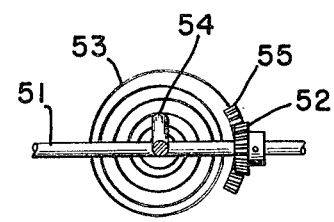

FIG. 12 is a top view of the thermostatic spring and cover gearing arrangement.

Figure 13:
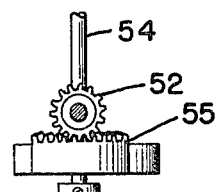

FIG. 13 is a right side elevation view of FIG. 12.

Figure 14:
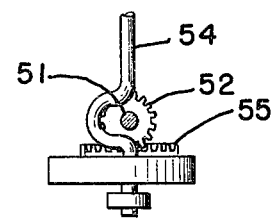

FIG. 14 is the left side elevation view of FIG. 12.

For a more detailed description of the preferred embodiment, referring to FIG. 1, liquid reservoir 20 is shown positioned to supply liquids to vaporizing chamber 21 through liquid delivery pipe 22. Liquid entry valve housing 23, connected to delivery pipe 22 is shown mounted on heating chamber 21. Liquid can thereby pass through entry pipe 22, into valve housing 23, through piston 24 and continue into the hollow center or passageway of piston rod 25 for delivery into heating chamber 21 through liquid entry ports 26. Valve housing 23 and piston 24 may be so constructed to minimize thermal conduction from heating chamber 21 by spacially separating valve housing 23 and heating chamber 21. The liquid is then diffused evenly throughout heating chamber 21 by the capillary action of wick member 27. The rays of the sun that strike heating chamber 21 will vaporize the liquid contained in wick 27 creating a high pressure inside chamber 21.

As the pressure inside chamber 21 reaches the desired level, liquid piston 24 is urged towards heating chamber 21.

Resilient member 29 is progressively less resistive as vapor piston 31 moves toward vapor exiting port 28, and as shown in FIG. 1, vapors are allowed to pass into exiting chamber 30 when vapor piston 31 clears vapor exiting port 28. Vapor thus passing into exiting chamber 30 is directed into exit pipe 32 and is delivered to any desired location such as to a solar cooking stove (not shown). Condensate from a stove or other equipment may be returned to liquid supply 20 for recirculation by gravity or with suitable pumping means (not shown).

As the pressure decreases in heating chamber 21 due to the vapor escapement, resilient member 29 forces piston rod 25 to return to its previous position thereby closing vapor exiting port 28. Liquid piston 24 is designed to force the liquid contained in valve chamber 33 through piston rod 25 simultaneously with the closing of vapor exiting port 28. Thus, a new vaporizing cycle begins whereby liquid enters heating chamber 21 and is vaporized, causing vapor piston 31 to move past vapor exiting port 28, which in turn allows liquid piston 24 to expand valve chamber 33, thus decreasing the pressure in chamber 33. When the pressure drop from the liquid reservoir 20 to the valve chamber 33 is greater than the pressure drop, if any, along liquid delivery conduit 22 from the reservoir 20 to the valve chamber 33, then additional liquid is forced from said reservoir 20 through said conduit 22 into the valve chamber 33.

In FIG. 2 piston 31 is shown in its extended position, whereby vapor exiting port 28 (not shown in FIG. 2) would be opened, and resilient member 29 would be in a closed position.

FIG. 3 is an enlargement of the liquid valve arrangement of the preferred embodiment and check valve assemblies 34 and 35 are shown in their open positions to allow water or other liquids to pass through them. As liquid piston 24 closes by moving away from heating chamber 21, as would happen immediately after the liquid in heating chamber 21 has vaporized, check valve 34 is closed due to the compression of the valve chamber 33 and the resulting increase in pressure. Likewise, this increase in pressure in the valve chamber 33 causes the check valve 35 to open and the liquid in said chamber to flow through said valve and into the heating chamber 21. Valve feet 36 and 37 hold the check valves 35 and 34 in close proximity to their orifices so that the minimum of fluid flows in the reverse direction as they are being closed. Springs are optional on these valves but aid in closing them tightly and create a desirable potential pressure drop from the foot side of the orifice to the ball or check side of it. As liquid piston 24 closes by moving away from heating chamber 21, as would happen after all the liquid in heating chamber has vaporized and escaped, check valve 35 opens and check valve 34 is held closed due to the contact by liquid piston 24. Check valve 35 is opened by the increase in pressure in valve chamber 33 due to the compression of chamber 33 by liquid piston 24. For safety purposes a pressure regulating means in the form of a valve or other device can be connected to the vaporizing chamber in the event that the pressure inside the chamber reaches a predetermined maximum, for example in the event that check valve 35 fails to open.

As liquid piston 24 closes by moving away from heating chamber 21, for example, immediately after liquid in heating chamber 21 has all vaporized, check valve 34 is closed due to the compression of the valve chamber 33 and the resulting increase in pressure. This increase in pressure in the valve chamber 33 causes the check valve 35 to open and most of the liquid in said chamber to flow through said valve and on into the heating chamber. The valve foot 36 prevents check valve 35 from flowing down piston rod 25 and the valve feet hold the check valves in close proximity to their orifices so that a minimum of fluids flows in the reverse direction as they are closed. Springs or other resilient members are optional but can help close the check valves and aid in creating a desirable pressure increase from the foot side of the orifice to the ball or check side of it.

FIG. 4 demonstrates another liquid entry valve arrangement which may be used whereby piston rod 39 does not have a hollow passageway through its center to conduct the liquids entering heating chamber 21, but instead, piping member 40 is used to convey the liquid into heating chamber 21.

In another embodiment of the liquid entry valve arrangement, as shown in FIG. 5, camming valve members 41 and 42 rotate respectively about pivot members 43 and 44 to control the flow of liquid from delivery pipe 22 for passage into heating chamber 21 through piping member 40. In FIG. 5, camming member 41 is shown in its closed position while camming member 42 is open to allow liquid to flow from chamber 46 into chamber 47 and continue into piping member 40.

In FIG. 6, liquid piston 24 is shown in its closed position, abutting camming member 41 which in turn causes camming member 42 to close.

In FIG. 7, liquid piston 24 is shown in a more open position than in FIG. 6 whereby camming member 41 is open and camming member 42 is closed.

In another embodiment of the invention, liquids which are vaporized in heating chamber 21 may be subjected to additional heat by their passage through a superheater 48 as shown in FIG. 8. As vapors exit the heating chamber 21 through vapor exiting port 28, they are then directed into superheater 48 which is positioned so as to absorb additional solar radiation. The vapors become superheated and are then directed through vapor exiting pipe 32 and are conveyed to any desired location. The superheater 48 as shown in FIG. 9 is positioned on top of the hemispherical heating chamber 21, although other designs and constructions may position the superheater in other locations.

In another embodiment, as shown in FIG. 10, the sun's rays reaching heating chamber 21 may be regulated by a thermostat 49 which controls a shield or cover member 50. Shield 50 is rotatably mounted to cover or "block" the sun by shading the heating chamber 21, or a portion thereof. Shield 50 pivots on shaft member 51 which is rigidly affixed to spur gear 52.

Temperature adjustment knob 49 is connected to a bimetallic coil member 53 by thermostat connecting rod 54. As adjustment knob 49 is rotated by the operator for a lower temperature setting, in a counterclockwise direction, coil 53 is tightened which results in spur gear 52 rotating in a counterclockwise direction also. Shield 50 then "lowers" or covers an additional portion of heating chamber 21 and prevents radiation from striking the covered portion. Similarly, if a higher temperature is to be maintained within heating chamber 21, knot 49 is turned in a clockwise direction which urges the bimetallic coil 53 to expand causing clockwise movement of rack member 55 which in turn causes spur gear 52 to rotate in a clockwise direction and causes shield 50 to "open" or move upwardly allowing additional radiation to strike heating chamber 21.

Once set, temperature adjustment knob 49 and bimetallic coil 53 will keep the heating chamber 21 functioning at the desired temperature range as long as the rays from the sun or other external heating forces reach the chamber to vaporize the liquid.

Thermostat latch member 56 is shown in FIG. 11 along with thermostat graduations 57. Latch member 56 maintains temperature adjustment knob 49 at a desired setting, and prevents slippage and inadvertent temperature settling changes. Thermostat indicator mark 58 is shown positioned midway of the graduations 57 in FIG. 11, and may be rotated clockwise or counterclockwise as desired.

In FIG. 12, shaft member 51 is shown mounted above bimetallic coil 53, however, other designs may place shaft 51 below coil 53 and the exact placement of shaft 51 is a matter of choice by the builder, provided that the coil properly senses the temperature of the heating chamber 21 or superheater 48, when required.

In FIG. 13, rack member 55 is shown positioned for movement by spur gear 52 in either clockwise or counterclockwise direction.

In FIG. 14, thermostat connecting rod 54 is shown having a U-shaped configuration on its lower end to bypass shaft member 51 to prevent interference as temperature adjustment knob 49 is regulated by the operator to the desired setting.

Many variations and designs can be utilized which do not alter the improvements contained herein, and such modifications and changes are considered to be within the scope of this invention.

I claim:

1. A device for delivering solar heated fluids comprising: a solar heating chamber, a pressure releasable vapor outlet means in communication with said chamber, a fluid inlet means in communication with said chamber for supplying vaporized fluids to said chamber, said solar energy vaporizing chamber including a thermostatic regulating means, said regulating means including a chamber shield means, said shield means including a shaft and a rotatable shield mounted thereon for rotation around said shaft.

2. A device for delivering solar heated fluids comprising: a solar heating chamber, a pressure releasable vapor outlet means in communication with said chamber, a fluid inlet means in communication with said chamber for supplying vaporizable fluids to said chamber, said fluid inlet means comprising a piston assembly, said piston assembly having a piston rod, said piston rod having an inner passageway with at least one port communicating with said passageway and said chamber for delivering fluids to said chamber whereby said vaporizable fluids are vaporized and exit from said chamber through said outlet means.

3. A device for delivering solar heated fluids as claimed in claim 2, wherein said vapor outlet means is in communication with a downwardly directed piping means whereby said vaporized fluids are delivered downwardly.

4. A device for delivering solar heated fluids as claimed in claim 2, wherein said outlet means and said inlet means are suitably connected whereby closing said outlet means will open said inlet means.

5. A device for delivering solar heated fluids as claimed in claim 2, wherein said outlet means comprises a piston assembly means.

6. A device for delivering solar heated fluids as claimed in claim 5, wherein said piston assembly means is urged closed by a resilient member.

7. A device for delivering heated fluids as claimed in claim 2, and a pressure regulating means on said chamber.

8. A device for delivering heated fluids as claimed in claim 2, and a wick means in said chamber.

9. A device for delivering heated fluids as claimed in claim 2, and including a super heater for receiving vaporized fluids from said heating chamber.

* * * * *